US009849421B2

(12) United States Patent
Chandler et al.

(10) Patent No.: US 9,849,421 B2
(45) Date of Patent: Dec. 26, 2017

(54) CATALYTIC FILTER HAVING A SOOT CATALYST AND AN SCR CATALYST

(71) Applicant: Johnson Matthey Public Limited Company, London (GB)

(72) Inventors: Guy Richard Chandler, Royston (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/279,511

(22) Filed: Sep. 29, 2016

(65) Prior Publication Data

US 2017/0087513 A1 Mar. 30, 2017

Related U.S. Application Data

(60) Provisional application No. 62/234,123, filed on Sep. 29, 2015.

(51) Int. Cl.
| | | |
|---|---|---|
| *F01N 3/033* | (2006.01) | |
| *F01N 3/035* | (2006.01) | |
| *B01D 46/00* | (2006.01) | |
| *B01D 53/94* | (2006.01) | |
| *B01J 23/10* | (2006.01) | |
| *B01J 23/34* | (2006.01) | |
| *B01J 23/72* | (2006.01) | |
| *B01J 23/745* | (2006.01) | |
| *B01J 29/76* | (2006.01) | |
| *B01J 23/83* | (2006.01) | |
| *B01J 35/04* | (2006.01) | |

(52) U.S. Cl.
CPC .......... *B01D 53/9418* (2013.01); *B01J 23/83* (2013.01); *B01J 29/763* (2013.01); *B01J 35/04* (2013.01); *B01D 2255/2065* (2013.01); *B01D 2255/20715* (2013.01); *B01D 2255/20761* (2013.01); *B01D 2255/915* (2013.01)

(58) Field of Classification Search
CPC ........ F01N 3/033; F01N 3/035; F01N 3/2066; B01D 46/00; B01D 46/2418; B01D 53/9413; B01D 53/9418; B01D 53/9422; B01D 2255/2065; B01D 2255/2073; B01D 2255/20738; B01D 2255/20761; B01D 2257/402; B01D 2257/404; B01D 2258/01; B01D 2258/012; B01D 2258/014; B01J 23/10; B01J 23/34; B01J 23/72; B01J 23/745
See application file for complete search history.

(56) References Cited

U.S. PATENT DOCUMENTS

| | | | |
|---|---|---|---|
| 4,010,238 A | 3/1977 | Shiraishi et al. | |
| 4,085,193 A | 4/1978 | Nakajima et al. | |
| 4,902,487 A | 2/1990 | Cooper et al. | |
| 9,597,664 B2 * | 3/2017 | Chigapov | B01D 53/9418 |
| 2003/0108465 A1 * | 6/2003 | Voss | B01D 53/9454 423/213.2 |
| 2006/0216227 A1 | 9/2006 | Idem et al. | |
| 2010/0170230 A1 | 7/2010 | Chiffey et al. | |
| 2010/0180580 A1 | 7/2010 | Boorse et al. | |
| 2010/0254862 A1 * | 10/2010 | Sato | B01D 53/9418 422/171 |
| 2010/0290963 A1 | 11/2010 | Andersen et al. | |
| 2011/0142737 A1 * | 6/2011 | Seyler | B01D 53/9418 423/213.2 |
| 2012/0141347 A1 | 6/2012 | Collier et al. | |
| 2012/0240554 A1 * | 9/2012 | Qi | B01D 53/9422 60/274 |
| 2014/0093442 A1 * | 4/2014 | Spreitzer | B01D 53/944 423/239.1 |

FOREIGN PATENT DOCUMENTS

| | | | |
|---|---|---|---|
| DE | 69601860 T2 | 10/1999 | |
| EP | 0246859 A1 | 11/1987 | |
| EP | 2206553 A1 | 7/2010 | |
| RU | 2597090 C2 * | 9/2016 | B01D 53/944 |
| WO | 9939809 A1 | 8/1999 | |
| WO | 2008015752 A2 | 5/2008 | |
| WO | 2009001131 A1 | 12/2008 | |
| WO | 2012059211 A1 | 5/2012 | |

OTHER PUBLICATIONS

Liang, Qing et al.; Selective oxidation of soot over Cu doped ceria/ceria-zirconia catalysts; Catalysis Communications 9 (2008) 202-206.

* cited by examiner

*Primary Examiner* — Timothy Vanoy
(74) *Attorney, Agent, or Firm* — Gary D. Mangels

(57) ABSTRACT

A catalytic filter is provided having a mixture of an SCR catalyst and soot oxidation catalyst where the soot oxidation catalyst is a copper doped ceria, iron doped ceria or manganese doped ceria. The mixture of an SCR catalyst and soot oxidation catalyst provides for a lowering of the peak oxidation temperature for soot removal from the filter. The use of the filter allows for improved soot combustion and reduces the susceptibility of an SCR catalyst contained on a filter to deterioration. The soot oxidation catalyst also improves the resistance of the SCR catalyst to poisoning and subsequent deterioration of SCR performance.

28 Claims, 2 Drawing Sheets

CATALYTIC FILTER HAVING A SOOT CATALYST AND AN SCR CATALYST

CROSS-REFERENCE TO RELATED APPLICATIONS

This application claims priority to U.S. Provisional Application No. 62/234,123, filed Sep. 29, 2015, which is incorporated herein by reference.

FIELD OF THE INVENTION

The present invention relates to catalysts, systems, and methods that are useful for treating an exhaust gas that is produced during combustion of hydrocarbon fuel, particularly a lean burn exhaust gas containing soot and nitrogen oxides produced by a diesel engine.

BACKGROUND

Exhaust gas is generated during the combustion of fuels such as natural gas, gasoline, diesel fuel, fuel oil or coal. When the combustion occurs in a chamber such as an engine or furnace, the resulting exhaust gas is typically treated prior to being discharged into the atmosphere through an exhaust pipe, flue gas stack or the like. Although the largest portion of exhaust gas consists of nitrogen ($N_2$), water vapor ($H_2O$), and carbon dioxide ($CO_2$), which are considered to be innocuous compounds, untreated exhaust gas also contains relatively low amounts of undesirable noxious and/or toxic substances, such as carbon monoxide (CO) from incomplete combustion, hydrocarbons (HC) from un-burnt fuel, nitrogen oxides ($NO_x$) (e.g., nitric oxide (NO), nitrogen dioxide ($NO_2$), and nitrous oxide ($N_2O$)) from excessive combustion temperatures, and particulate matter (insoluble carbon soot particles. In addition small amounts of liquid hydrocarbons (e.g. lube oil and unburned fuel), and various other organic compounds may be present. The present invention relates to exhaust gas emitted from diesel engines which typically operate using a high air-to-fuel ratio (i.e., very lean conditions). Such lean burn conditions often result in an exhaust gas with relatively high emissions of particulate matter and $NO_x$—two components which have proved to be difficult to efficiently convert into more benign substances.

Diesel engines are often equipped with exhaust systems that include one or more catalytic components which work separately, or in combination, to treat exhaust gas prior to its emission into the atmosphere. For example, it is known that $NO_x$ can be converted into elemental nitrogen, $N_2$, and water by reacting $NO_x$ in the exhaust gas with $NH_3$ in the presence of certain supported catalysts via a process commonly referred to as selective catalytic reduction (SCR). Known SCR catalysts include vanadium ($V_2O_5$) carried by a mixture of ceria ($CeO_2$) and alumina ($Al_2O_3$) on a support (see EP 0 246 859), or $V_2O_5/WO_3$ supported on $TiO_2$ (see WO 99/39809). Other SCR catalysts have also been proposed such as mixed metal oxides such as Fe—W/$CeZrO_2$ (WO 2009/001131) and aluminosilicate and silicoaluminophosphate molecular sieves loaded with an extra-framework metal such as Cu:SAPO-34 (See is there is patent US 2010/0290963). NOx treatment involves the gas phase transformation of NOx into nitrogen gas ($N_2$) and water vapor ($H_2O$).

Unlike $NO_x$ treatment, soot remediation in an exhaust gas typically involves mechanical filtration. For example, soot emissions can be reduced by passing a soot-containing exhaust gas through a diesel particulate filter (DPF), such as a cordierite wall-flow filter (check if patent US 2010/0170230). When soot-containing exhaust gas is passed through a filter, the soot containing particles are removed from the gas and become placed on or in the filter. While this process can be effective in removal of the particles, the accumulation of soot particles on or in the filter can cause an undesirable increase in the back pressure across the filter. This increase in back pressure typically leads to decreased engine performance and efficiency. The accumulated carbon-based soot can be removed from the filter by regenerating the filter, which is typically accomplished by periodically combusting the soot. One such combustion technique involves catalytic oxidation of the soot at low temperatures via a soot oxidation catalyst incorporated onto the filter (i.e., a catalytic soot filter (CSF)) (U.S. Pat. No. 4,902,487).

Conventional exhaust systems comprise separate components for $NO_x$ treatment (SCR) and soot treatment (CSF). Yet it is often desirable to design individual exhaust components to perform more than one function in order to reduce the total space required by the exhaust system, reduce costs, etc. For example, applying an SCR catalyst to a filter substrate (SCRF) serves to reduce the overall size of an exhaust treatment system by allowing one substrate to serve two functions, namely catalytic conversion of $NO_x$ by the SCR catalyst and removal of soot by the filter. For example, U.S. Pat. Pub. 2010/0180580 discloses an SCR catalyst can be applied to a wall-flow DPF. However, removal of the soot oxidation catalyst in an SCRF requires the soot accumulated at the filter surface to be burned at very high temperatures. Accordingly, there remains a need for an efficient system for treating soot and NOx in lean burn exhaust gas. This invention satisfies that need among others.

SUMMARY OF THE INVENTION

The present invention relates to the discovery that a catalytic filter having an SCR catalyst combined with a soot oxidation catalyst comprising copper doped ceria, iron dope ceria or a manganese doped ceria together on the catalytic filter can result in lower soot combustion temperatures without affecting the SCR reaction. By coating a filter substrate with a mixture of a soot oxidation catalyst capable of burning particulates and a SCR catalyst, the complexity, size, and cost of an exhaust gas treatment system can be reduced. Moreover, the soot oxidation catalyst will not consume nitrogen-based reductants (urea, ammonia, etc.) that are required for the downstream SCR reaction. Therefore, the present invention allows a reductant to be dosed into the exhaust gas upstream of the filter containing the soot oxidation catalyst.

In one aspect of the invention, a composition comprises an SCR catalyst and a soot oxidation catalyst comprising copper doped ceria, iron doped ceria or a manganese doped ceria, where the composition is formulated for application to a filter and the SCR catalyst and the soot oxidation catalyst are present in the filter as a mixture.

In another aspect of the invention, a filter comprises a mixture of an SCR catalyst and a soot oxidation catalyst comprising copper doped ceria, iron doped ceria or manganese doped ceria.

In yet another aspect of the invention, a system for treating a lean burn exhaust gas comprises: (a) a nitrogenous reducing agent injector; and (b) a catalytic filter comprising (i) an SCR catalyst and (ii) a soot catalyst comprising copper doped ceria, iron doped ceria or a manganese doped ceria, where the SCR catalyst and the soot catalyst are present on the filter as a mixture, and the injector is disposed upstream of, and is in fluid communication with, the catalytic filter.

In still another aspect of the invention, a method for treating a lean burn exhaust gas comprises (a) flowing a lean burn exhaust gas stream comprising soot, NOx, and a nitrogenous reducing agent through a catalytic filter comprising (i) an SCR catalyst and (ii) a soot catalyst comprising copper doped ceria, iron doped ceria or manganese doped ceria, where the SCR catalyst and the soot catalyst are present on the filter as a mixture, (b) oxidizing at least a portion of the soot on the catalytic filter; and (c) reducing at least a portion of the NOx.

In yet another aspect of the invention, a method of improving soot combustion on an SCR containing filter comprises providing the filter with a soot oxidation catalyst comprising copper doped ceria, iron doped ceria or manganese doped ceria.

In another aspect of the invention, a method of reducing the susceptibility of an SCR catalyst contained on a filter to deterioration comprises providing the filter with a soot oxidation catalyst comprising copper doped ceria, iron doped ceria or manganese doped ceria.

In yet another aspect of the invention, a method of lowering the soot combustion temperature for soot on a filter comprises providing the filter with a soot oxidation catalyst comprising copper doped ceria, iron doped ceria or manganese doped ceria.

In still another aspect of the invention, a method of improving the resistance of an SCR catalyst on a filter to poisoning comprises providing the filter with a soot oxidation catalyst comprising copper doped ceria, iron doped ceria or manganese doped ceria.

DETAILED DESCRIPTION OF THE INVENTION

Figure 1:
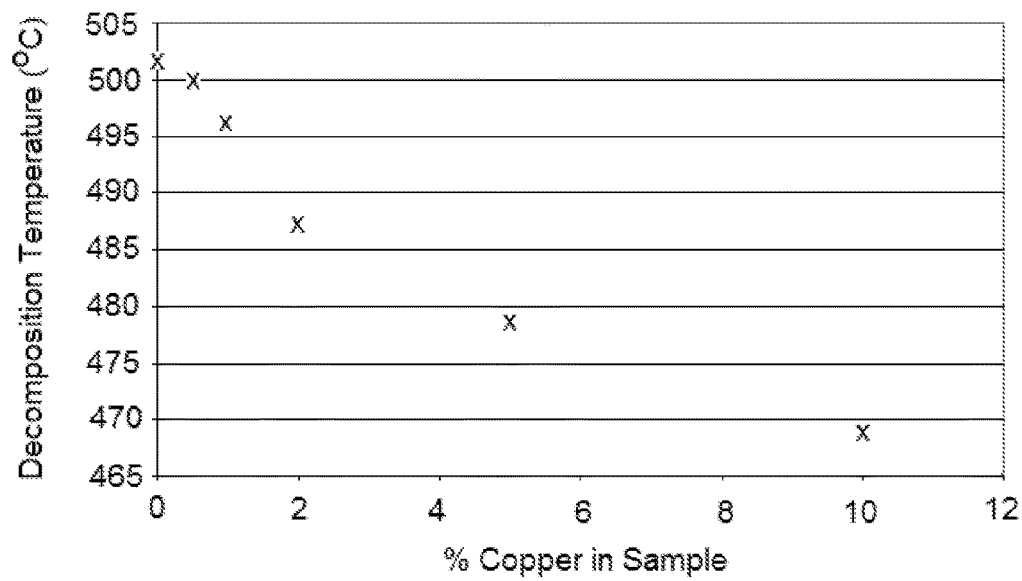
FIG. 1 is a graph of the effect of copper loadings on the decomposition temperature.

The invention is directed to a catalytic filter that is capable of removing soot and $NO_x$ from a lean burn exhaust gas. The catalytic filter comprises an SCR catalyst and a soot catalyst comprising copper doped ceria, iron doped ceria or manganese doped ceria, where the SCR catalyst and the soot oxidation catalyst are present in the filter as a mixture.

Soot Combustion Catalyst

The soot combustion catalyst comprises copper doped ceria, iron doped ceria or manganese doped ceria.

The copper doped ceria, iron doped ceria or manganese doped ceria can be doped with: (a) zirconia, (b) zirconia and praseodymium, (c) zirconia and neodymium, or (d) zirconia, praseodymium and neodymium.

Copper or manganese can be present at from 0.5 to 15% by weight relative to the weight of the doped ceria.

Iron can be present at from 0.5 to 10% by weight relative to the weight of the doped ceria.

SCR Catalyst

The SCR catalyst can comprise a base metal, an oxide of a base metal, a metal supported on a mixed oxide, a molecular sieve, a metal-containing molecular sieve or a mixture thereof.

The base metal can be selected from the group consisting of cerium (Ce), chromium (Cr), cobalt (Co), copper (Cu), iron (Fe), manganese (Mn), molybdenum (Mo), nickel (Ni), tungsten (W), and vanadium (V), and mixtures thereof.

SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

The SCR catalyst can comprise a metal supported on a mixed oxide comprising at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, wherein the at least one transition metal is selected from the group consisting of a Group VIB metal, a Group IB metal, a Group IVA metal, a Group VB metal, a Group VIIB metal, a Group VIII metal and mixtures of any two or more thereof, provided that at least one selected transition metal is tungsten, provided that the content of cerium and zirconium as oxides in the catalytic component is $Ce_xZr_{1-x}O_2$, wherein X=0.1-0.5, preferably X=0.2-0.5. This type of an SCR catalyst has been described in US2012/0141347. The at least one transition metal can be selected from the group consisting of Cr, Ce, Mn, Fe, Co, Ni, W and Cu. Preferably, the at least one transition metal is selected from the group consisting of Fe, W, Ce, Mn and Cu. More preferably, the at least one transition metal comprises iron and manganese. The at least one transition metal can comprise iron and tungsten.

The total amount of the at least one transition metal present in the catalytic component is from 0.1 to 30 wt %, based on the total weight of the catalytic component.

The catalytic component can consist of (ii) cerium oxide and zirconium oxide as single oxides or a composite oxide thereof or a mixture of the single oxides and the composite oxide dispersed on an inert oxide support material and the inert oxide support is selected from the group consisting of alumina, titania, non-zeolite silica-alumina, ceria, zirconia and mixtures, composite oxides and mixed oxides of any two or more thereof.

The catalytic component can have been activated at a temperature of at least 600° C.

The catalytic composition can further comprise a second catalytic component consisting of iron and tungsten dispersed on zirconia. The first catalytic component and the second catalytic component can be disposed in separate zones or layers or the catalytic composition can be a blend of the first and second catalytic components.

The SCR catalyst can comprise at least one catalytic component consisting of (i) two or more transition metals dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, whereon is dispersed at least two transition metals. The two or more transition metals can be selected from the group consisting of a Group VIB metal, a Group IB metal, a Group IVA metal, a Group VB metal, a Group VIIB metal, a Group VIII metal and mixtures of any two or more thereof. Preferably, the two or more transition metals comprise tungsten. The content of cerium and zirconium as oxides in the catalyst can be $Ce_xZr_{1-x}O_2$, where X=0.1-0.9, preferably X=0.1-0.5. This type of SCR catalyst is described in U. S. Patent Application Publication No. 2012/0141347, the entire contents of which are incorporated herein by reference.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter can be selected from barium (Ba), calcium (Ca), cerium (Ce), lanthanum (La), magnesium (Mg), manganese (Mn), molybdenum (Mo), neodymium (Nd), niobium (Nb), praseodymium (Pr), strontium (Sr), tantalum (Ta), tin (Sn), zinc (Zn), zirconium (Zr), and oxides thereof. The at least one base metal catalyst promoter can preferably be $CeO_2$, CoO, CuO, $Fe_2O_3$, $MnO_2$, $Mn_2O_3$, $SnO_2$, and mixtures thereof.

The at least one base metal catalyst promoter may be added to the catalyst in the form of a salt in an aqueous solution, such as a nitrate or an acetate.

The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can contain from at least about 0.1 weight percent, at least about 0.5 weight percent, at least about 1 weight percent, or at least about 2 weight percent to at most about 10 weight percent, about 7 weight percent, about 5 weight percent of a promoter metal based on the total weight of the promoter metal and support.

The SCR catalyst can comprise a molecular sieve or a metal-containing molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. As is used herein "metal-containing molecular sieve" means a metal exchanged or metal substituted molecular sieve. The SCR catalyst can comprise an aluminosilicate molecular sieve, an aluminophosphate molecular sieve, a silicoaluminophosphate molecular sieve, a metal-containing aluminosilicate molecular sieve, a metal-containing aluminophosphate molecular sieve, or a metal-containing silicoaluminophosphate molecular sieve. Preferably, the molecular sieve is a metal-containing molecular sieve. As used herein, the term molecular sieve comprises molecular sieves made of the following materials: aluminosilicates, metal-containing aluminosilicates, aluminophosphates (AlPO), metal-containing aluminophosphates (MeAlPO), silico-aluminophosphates (SAPO), and metal-containing silico-aluminophosphates (MeAPSO) molecular sieves. This term includes traditional zeolitic molecular sieves, which had been limited to being a microporous aluminosilicate having any one of the framework structures listed in the Database of Zeolite Structures published by the International Zeolite Association (IZA). One of ordinary skill in the art would recognize that the other families described above are also considered to be zeolites by those in the art.

The SCR catalyst can comprise a small pore molecular sieve. A small pore molecular sieve contains channels defined by up to eight tetrahedral atoms. The SCR catalyst can comprise a small pore molecular sieve selected from the group consisting of aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeAPSO) molecular sieves, and mixtures thereof.

The SCR catalyst can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of AEI, AFX, CHA, DDR, ERI, ITE, KFI, LEV and SFW.

The SCR catalyst can comprise a molecular sieve or a metal-containing molecular sieve where the molecular sieve or the molecular sieve in the metal-containing molecular sieve comprises a Framework Type selected from the group consisting of: AEI, BEA (beta zeolites), CHA (Chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, beta zeolite, mordenite, silicalite, zeolite X, and ZSM-5.

Aluminosilicate zeolites can have a silica/alumina molar ratio (SAR) defined as $SiO_2/Al_2O_3$) from at least about 5, preferably at least about 20, with useful ranges of from about 10 to 200.

A metal-containing molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metal selected from the group consisting of cerium, chromium, cobalt, copper, gallium, indium, iridium, iron, manganese, molybdenum, nickel, palladium, platinum, ruthenium, rhenium, silver, tin and zinc. More preferably the metal is copper.

The metal can be combined with the molecular sieve using a mixture or a solution of the metal precursor in a suitable solvent. The term "metal precursor" means any compound or complex that can be dispersed on the molecular sieve to give a catalytically-active metal component. This invention is not restricted to metal precursors of a particular type, composition, or purity. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$).

The molecular sieve can be added to the solution of the metal component to form a suspension, which is then allowed to react so that the metal component is distributed on the molecular sieve.

The metal can be distributed in the pore channels as well as on the outer surface of the molecular sieve.

The metal can be distributed in ionic form or as a metal oxide. For example, copper may be distributed as copper (II) ions, copper (I) ions, or as copper oxide.

The molecular sieve containing the metal can be separated from the liquid phase of the suspension, washed, and dried. The resulting metal-containing molecular sieve can then be calcined to fix the metal in the molecular sieve.

A metal-containing molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight. The weight % of a metal in a metal-containing molecular sieve is the weight of the metal divided by the total weight of the metal and the molecular sieve times 100.

The SCR catalyst can be present in a catalyst article at a concentration of about 0.5 to about 2.0 g/in$^3$. The amount of the SCR present in the catalyst article can depend on the type of SCR catalyst in the article. When the SCR catalyst comprises a base metal or an oxide thereof, the base metal can be present at a concentration of 0.01 to 20 wt. % based on the total weight of the SCR catalyst. When the SCR catalyst comprises a molecular sieve or a metal-containing molecular sieve, the molecular sieve can be present at a concentration of 40 to 80 wt. %, based on the total weight of the SCR catalyst.

Certain SCR catalyst compositions are typically applied to the filter as a washcoat slurry. Other SCR catalyst compositions can be applied to the filter as an aqueous solution.

The soot oxidation catalyst and the SCR catalyst can be present in a weight ratio from 5:95 to 95:5, respectively, preferably from 5:95 to 50:50, more preferably from 10:90 to 30:70.

The soot catalyst and the SCR catalyst can include other, non-catalytic components such as carriers, stabilizers and, promoters. These additional components do not necessarily catalyze the desired reaction, but instead improve the catalytic material's effectiveness, for example by increasing its operating temperature range, increasing contact surface area of the catalyst, etc.

A catalyst comprising a catalytic component can also include additional, non-catalytic components as well. Examples of such optional, non-catalytic components can include non-doped alumina, titania, non-zeolite silica-alumina, ceria, and zirconia that are present in the catalyst composition, but serve one or more non-catalytic purposes.

The type of DPF substrate for use in the present invention is not particularly limited provided that the filter is a suitable substrate for both the SCR catalyst and the soot oxidation catalyst and has suitable physical properties, such as porosity, mean pore size, etc., that are compatible with the SCR and soot oxidation catalysts. Suitable DPF can include nonwoven fibrous filters and metallic or cordierite honeycombs, as well as other types of diesel particulate filters. Preferred filter substrates for use in mobile application are monoliths having a so-called honeycomb geometry which comprises a plurality of adjacent, parallel channels, each channel typically having a square, round, hexagonal, or triangular cross-sectional. The honeycomb shape provides a large catalytic surface with minimal overall size and pressure drop. Other substrates include sheets or screens that can be zoned in any suitable fashion including, for example, stacking, rolling, or arraying about a central axis. Other substrates include packed beds which can be formed with pellets of the adsorbent, preferably held together with a binder or sintered to form a cohesive mass.

Soot filters for use in the present invention can be fabricated using a variety of materials including sintered metal, ceramic or metal fibers, etc. A preferred type of filter is a so-called "wall-flow" filter made from porous ceramic or other material in the form of a monolithic array of many small channels running substantially parallel over a majority of the length of the filter body, and wherein the channels are capped at alternate ends in a checkerboard fashion. Specific materials of construction for wall-flow monoliths include cordierite, α-alumina, silicon carbide, silicon nitride, zirconia, mullite, spodumene, alumina-silica-magnesia or zirconium silicate, ceramic composite fibers, or a porous refractory metal. Preferred materials include cordierite, silicon carbide, and alumina titanate.

Capping or plugging alternate ends of the channels of the wall-flow filter forces the exhaust gas through the porous ceramic channel walls. Although porous, these walls prevent most of the particulate from passing through. That is, exhaust gas untreated by the catalytic filter flows into the substrate channels (i.e., the filter inlet) where it contacts the upstream side of a substrate wall. During operation of an engine, a pressure differential exists between the inlet and outlet faces of the substrate (higher pressure at the inlet face relative to the outlet face), and thus a pressure differential also exists between the upstream side and downstream side of the substrate wall. This pressure differential, along with the gas permeable nature of the walls, allows the exhaust gas that flows into a channel which is open to the inlet face, to pass from the upstream side of a porous wall to the downstream side of that wall, and then into an adjacent channel (i.e., filter outlet) which is open to the downstream section of the exhaust system. Wall flow filters useful in the present invention have up to about 700 channels (cells) per square inch of cross section. The wall-flow filter can contain about 100 to 400, cells per square inch ("cpsi").

The actual shape and dimensions of the filter substrate, as well as properties such as channel wall thickness, its porosity, etc., depend on the particular application of interest. The mean pore size of the porous substrate is important for filtration. Mean pore size can be determined by any acceptable means, including by mercury porosimetry. The mean pore size of the porous substrate should be of a high enough value to promote low backpressure, while providing an adequate efficiency. Preferred porous substrates have a mean pore size of about 5 to 50 μm, for example about 10 to about 40 μm, about 20 to about 30 μm, about 10 to about 25 μm, about 10 to about 20 μm, about 20 to about 25 μm, about 10 to about 15 μm, and about 15 to about 20 μm.

The wall-flow filters can have a porosity of at least about 30, preferably at least 40% (e.g., from 45% to 75%) and more preferably at least 55% (e.g., from 55% to 75%).

Wall flow filters for use with the present invention preferably have an efficiency of least 70%, at least about 75%, at least about 80%, or at least about 90%. The efficiency can be from about 75 to about 99%, about 75 to about 90%, about 80 to about 90%, or about 85 to about 95%. The efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns. Preferred porosity for cordierite filters is from about 60 to about 75%.

During normal operation of the exhaust system, soot and other particulates accumulate on the upstream, or inlet, sides of the filter which lead to an increase in backpressure. To alleviate this increase in backpressure, the filter substrates are continuously or periodically regenerated by combusting the accumulated soot. The combustion process is promoted by the soot oxidation catalyst. The exhaust gas also contacts the SCR catalyst mixed with the soot oxidation catalyst and reacts to eliminate a major portion of the $NO_x$ components from the exhaust gas.

The soot oxidation catalyst and SCR catalyst can be incorporated into or onto a filter by any practical means that allows for a mixture of the two catalysts to be present on the filter. For example, a washcoat comprising a mixture of the two catalysts can be applied to the inlet side (face) of the filter. The method of applications and the properties of the washcoat can be modified using techniques known to one skilled in the art, such as the application of pressure or a vacuum. After the washcoat is applied, it is dried and then calcined. The temperature and length of time used in the calcination can vary depending upon the specific combination of soot catalyst and SCR catalyst used. Calcination can be performed at a temperature of about 400° C. to about 600° C. for about 1 to about 3 hours. In some combinations of the soot catalyst and the SCR catalyst, the catalytic coating can be activated, preferably at a temperature of about 100° C. to about 300° C. for about 1 to about 3 hours.

Another aspect of the invention is directed to a system for treating lean-burn exhaust gas. Such exhaust gas systems are configurations of two or more discrete devices or components, each of which are capable of modifying the composition of the exhaust gas independently of the other(s), but interact with the other(s) to form a coherent scheme for treating the exhaust gas. Preferably, one or more of the components of the exhaust gas system interact to produce a synergistic result.

A system of the present invention can comprise a filter comprising a mixture of a soot oxidation catalyst and an SCR catalyst, as described herein, in fluid communication with an injector or other device for introducing a nitrogenous reductant into the exhaust gas, wherein the injector or other device is disposed upstream of the filter.

It has been discovered that the soot oxidation catalyst will not consume a nitrogen-based reductant (urea, ammonia, etc.) which is required for the SCR reaction. Therefore, the present invention allows a reductant to be dosed into the exhaust gas upstream of the filter containing a mixture of a soot oxidation catalyst and an SCR catalyst.

The system can further comprise an exhaust gas stream generated by a lean burn internal combustion engine, one or more conduits for carrying a flowing exhaust gas, wherein the conduits are in fluid connection with at least some of the components of the exhaust system, and/or a source of nitrogenous reductant.

The injector can continuously, periodically, or intermittently introduce the reductant, such gaseous ammonia, ammonia in aqueous solution, aqueous urea, or ammonia from an ammonia generator, into the exhaust gas at a dose effective for optimization of the downstream SCR reaction.

The injector is in fluid communication with the exhaust gas stream and may be attached, connected to, and/or integrated with a conduit, such as a pipe, for directing the exhaust through at least a portion of the exhaust gas system. The injector may also be in fluid communication with a reduction agent supply tank to provide for repeated injections of the reduction agent.

Metering of the amount of nitrogenous reductant introduced into the system can be controlled in response to the quantity of nitrogen oxides in the exhaust gas. The amount of reductant can be determined either directly (using a suitable NOx sensor) or indirectly, such as by using pre-correlated look-up tables or maps stored in a control means that correlate any measurement indicative of a condition of the engine with a predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3/NO$ and 4:3 $NH_3/NO_2$. The control means can comprise a pre-programmed processor such as an electronic control unit (ECU). Controlling the metering involves limiting the introduction of the nitrogenous reductant into the flowing exhaust gas only when it is determined that the SCR catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

The injector can be disposed upstream of the catalytic filter with no intervening SCR or other catalytic components between the injector and the filter so that $NH_3$ in the exhaust stream is not consumed or otherwise utilized after it enters the exhaust gas stream and prior to contacting the SCR catalyst on the filter.

All, or at least a portion, of the nitrogen-based reductant, particularly $NH_3$, can be supplied by a $NO_X$ adsorber catalyst (NAC), a lean $NO_X$ trap (LNT), or a $NO_X$ storage/reduction catalyst (NSRC), disposed upstream of the catalytic filter. One of the functions of the NAC in the present invention is to provide a source of $NH_3$ for the downstream SCR reaction. Accordingly, the NAC is configured in the system in a manner similar to that of the injector—i.e., upstream of the catalytic filter and preferably with no intervening SCR or other catalytic components between the NAC and the filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, such as during the periodically rich regeneration events, $NH_3$ may be generated over a $NO_x$ adsorber catalyst. Positioning an SCR catalyst downstream of the $NO_x$ adsorber catalyst may improve the overall system $NO_x$ reduction efficiency. In a combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The system can further comprise a diesel oxidation catalyst (DOC) to oxidize a hydrocarbon based soluble organic fraction (SOF) and carbon monoxide content of diesel exhaust by simple oxidation:

$$CO + \tfrac{1}{2} O_2 \rightarrow CO_2$$

$$[HC] + O_2 \rightarrow CO_2 + H_2O$$

The DOC may also serve to oxidize NO into $NO_2$, which in turn, may be used to oxidize particulate matter in particulate filter. Additionally, the DOC may serve to reduce the particulate matter (PM) in the exhaust gas.

Preferably, the DOC is disposed upstream of the upstream of the catalytic filter, and more preferably upstream of the SCR reductant injector or NAC.

An oxidation catalyst for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The system can further comprise a Closed Coupled Catalyst (CCC) upstream of the DOC.

The oxidation catalyst can include at least one platinum group metal (or a combination of two or more of these metals), such as platinum, palladium, or rhodium, coated on a flow-through monolith substrate. Other metal catalysts that can be used in the DOC include aluminum, barium, cerium, alkali metals, alkaline-earth metals, rare-earth metals, or combinations of two or more thereof. The at least one platinum group metal can be platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia. The diesel oxidation catalyst composition can contain about 10 to 120 $g/ft^3$ of a platinum group metal (e.g., platinum, palladium or rhodium) dispersed on a high surface area, refractory oxide support (e.g., $\gamma$-alumina).

One or more additional SCR catalyst components can be included in the system, preferably downstream of the catalytic filter, to further reduce the concentration of $NO_x$ in the exhaust gas. For example, upon exiting the catalytic filter, the exhaust gas can pass through a flow-through substrate coated with an SCR catalyst. In this example, the flow-through SCR catalyst is disposed downstream of the catalytic filter. The $NO_x$ concentration in the exhaust gas is reduced as the gas passes through the catalytic filter and then is further reduced as the gas sequentially passes through the one or more SCR flow-through substrates. The system can further comprise an additional reductant injector upstream of the SCR flow-through catalyst and downstream of the catalytic filter. The one or more downstream SCR flow-through catalysts can be extruded articles.

The number of additional SCR catalyst flow-through components can be of any practical number, such as 1, 2, 3, or 4. The downstream SCR catalyst(s) may be the same or different from the SCR catalyst coated on the catalytic filter. Preferred SCR catalysts include copper containing small pore molecular sieves, such as chabazites, having extra-framework or free copper, including Cu:SSZ-13 and Cu:SAPO-34.

The system can further comprise an ammonia slip catalyst (ASC) disposed downstream of the catalytic filter. The ammonia slip catalyst can be disposed downstream of the flow-through SCR components. The ASC serves to oxidize most, if not all, of the ammonia prior to emitting the exhaust gas into the atmosphere or passing the exhaust gas through a recirculation loop prior to exhaust gas entering/re-entering the engine. The ASC reduces: (a) the concentration of ammonia slip from the SCR reaction, (b) the release of ammonia from the catalyst surface during rapid temperature increases, and/or (c) from the use of a stoichiometric excess of reductant. Preferably, the ASC material should be selected to favor the oxidation of ammonia instead of the formation of $NO_x$ or $N_2O$. Preferred catalyst materials include platinum, palladium, or a combination thereof, with platinum or a platinum/palladium combination being preferred. Preferably, the catalyst is disposed on a high surface area support, including but not limited to alumina.

The ASC can be applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure.

Achieving low backpressure is particularly important to minimize the ASC's effect on the low-pressure EGR performance. The ASC can be applied to the substrate as a washcoat, preferably to achieve a loading of about 0.3 to 2.3 $g/in^3$. To provide further $NO_x$ conversion, the front part of the substrate can be coated with just SCR coating, and the rear coated with SCR and an $NH_3$ oxidation catalyst such as Pt or Pt/Pd on an alumina support.

Another aspect of the invention relates to a method of treating an exhaust gas whereby nitrogen oxides are reduced with a nitrogenous reducing agent at a temperature of at least 100° C., preferably from about 150° C. to 750° C. The method comprises the steps of flowing a lean burn exhaust gas containing soot, $NO_x$, and a nitrogenous reducing agent, preferably $NH_3$, through a catalytic filter comprising an SCR catalyst and a soot oxidation catalyst comprising copper doped ceria, iron doped ceria or manganese doped ceria, where the SCR catalyst and the soot catalyst are present on the filter as a mixture, wherein the exhaust gas exiting the filter has a reduced concentration of soot and $NO_x$ compared to the exhaust gas flowing into the filter.

The method of treating an exhaust gas can further comprise one or more of the following steps: (a) accumulating and/or combusting soot that is in contact with the inlet of the catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM)

in the exhaust gas; (e) contacting the exhaust gas with one or more flow-through SCR catalyst device(s) in the presence of a reducing agent to further reduce the NOx concentration in the exhaust gas, wherein the one or more flow-through SCR catalyst device(s) are preferably disposed downstream of the catalytic filter; and (f) contacting the exhaust gas with an ammonia slip catalyst, preferably downstream of the catalytic filter and, if present, the one or more flow-through SCR catalyst devices to oxidize most, if not all, of the ammonia prior to emitting the exhaust gas into the atmosphere or passing the exhaust gas through a recirculation loop prior to exhaust gas entering/re-entering the engine.

The SCR reaction can occur over a wide range of temperatures, generally from about 175° C. to about 900° C., depending upon the type of engine and/or exhaust gas being treated. Preferably the temperature is in the range of 350 to 800° C., more preferably in the range of 400 to 700° C. Nitrogen oxide reduction can be performed in the presence of oxygen.

In the methods described herein, the addition of nitrogenous reductant can be controlled so that $NH_3$ at the catalyst inlet is controlled to be 60% to 200% of theoretical ammonia calculated at 1:1 $NH_3/NO$ and 4:3 $NH_3/NO_2$. The ratio of nitrogen monoxide to nitrogen dioxide in the catalyst inlet gas can be from 4:1 to 1:3 by volume. The ratio of nitrogen monoxide to nitrogen dioxide in the gas can be adjusted by oxidizing nitrogen monoxide to nitrogen dioxide using an oxidation catalyst located upstream of the catalyst.

The nitrogenous reducing agent can be derived from any suitable source including ammonia per se, hydrazine or an ammonia precursor selected from the group consisting of urea $((NH_2)_2CO)$, ammonium carbonate, ammonium carbamate, ammonium hydrogen carbonate and ammonium formate. $NH_3$ can also be supplied by a lean NOx trap or similar device disposed upstream of the filter.

The method of treat an exhaust gas can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators. The method can be used for treating exhaust gas from a vehicular lean burn internal combustion engine, such as a diesel engine, a lean-burn gasoline engine or an engine powered by liquid petroleum gas or natural gas.

A filter comprising an SCR catalyst and a soot catalyst comprising copper doped ceria, iron doped ceria or manganese doped ceria, where the SCR catalyst and the soot catalyst are present on the filter as a mixture, can provide improved soot combustion compared to currently available SCR containing filters. SCRF coatings currently consist of an SCR catalyst (typically Fe or Cu zeolite) plus binder materials to ensure adhesion of the SCR catalyst to the substrate. Special additional components can be incorporated into the coatings to improve soot combustion while maintaining good SCR performance. Soot combustion components, such as alkali-metal containing elements or compounds thereof, are well known. However, these materials can significantly adversely affect the performance of the SCR catalyst. The soot combustion catalyst used in this invention (copper doped ceria, iron doped ceria or manganese doped ceria) are designed to minimize any impact on SCR performance. The doped ceria preferably comprises (a) zirconia, (b) zirconia and praseodymium, (c) zirconia and neodymium, or (d) zirconia, praseodymium and neodymium. Improving soot combustion of an SCRF is a particularly important because unlike catalysed soot filters (CSFs) that can use Pt to promote soot combustion via $NO_2$, SCRF cannot use such components because of the resulting dramatic effect of Pt on the SCR reaction due to ammonia oxidation.

A filter comprising an SCR catalyst and a soot catalyst comprising copper doped ceria, iron doped ceria or manganese doped ceria, where the SCR catalyst and the soot catalyst are present on the filter as a mixture, can provide improved resistance to poisoning compared to current filters. The soot catalyst can also interact with SCR-catalyst-poisons, such as PGM, inorganic ash components, thereby minimizing ash or PGM interactions with the SCR catalyst and subsequent deterioration of SCR performance. For flow-through SCR catalysts, ash can deteriorate the performance of the SCR catalyst. For SCRF catalysts, the poisoning effects can be much more significant because of the much higher temperatures to which the catalyst is exposed especially during soot regenerations. Furthermore, the ratio of the concentration of ash to catalyst is much higher because a significant proportion of the ash from the engine is collected within the filter and because SCR catalyst loadings can be much lower.

A method for trapping particulate matter from exhaust gas emitted from an engine comprises contacting the exhaust gas containing the particulate matter with a filter comprising a mixture of an SCR catalyst and a soot oxidation catalyst comprising copper doped ceria, iron doped ceria or a manganese doped ceria. The copper doped ceria, iron doped ceria or manganese doped ceria can be doped with: (a) zirconia, (b) zirconia and praseodymium, (c) zirconia and neodymium, or (d) zirconia, praseodymium and neodymium.

The soot catalyst and the SCR catalyst can be present in a weight ratio of 5:95 to 95:5, respectively, preferably from 5:95 to 50:50, more preferably from 10:90 to 30:70.

Copper or manganese can be present at from 0.5 to 15% by weight relative to the weight of ceria.

Iron can be present at from 0.5 to 10% by weight relative to the weight of ceria.

The composition can further comprise one or more additional metal oxides. The one or more additional metal oxides can comprise an oxide of zirconium, praseodymium or neodymium, or combinations of two or more of the oxides.

The amount of SCR catalyst in the filter can be reduced compared to a similar filter without copper doped ceria, iron doped ceria or manganese doped ceria.

A method for treating a lean burn exhaust gas comprises: (a) flowing a lean burn exhaust gas stream comprising soot, NOx, and a nitrogenous reducing agent through a catalytic filter comprising a mixture of an SCR catalyst and a soot oxidation catalyst comprising copper doped ceria, iron doped ceria or a manganese doped ceria, (b) oxidizing at least a portion of the soot with the soot oxidation catalyst; and (c) reducing at least a portion of the NOx with the SCR catalyst. The copper doped ceria, iron doped ceria or manganese doped ceria can be doped with: (a) zirconia, (b) zirconia and praseodymium, (c) zirconia and neodymium, or (d) zirconia, praseodymium and neodymium.

The soot catalyst and the SCR catalyst can be present in a weight ratio of 5:95 to 95:5, respectively, preferably from 5:95 to 50:50, more preferably from 10:90 to 30:70.

Copper or manganese can be present at from 0.5 to 15% by weight relative to the weight of ceria.

Iron can be present at from 0.5 to 10% by weight relative to the weight of ceria.

The composition can further comprise one or more additional metal oxides. The one or more additional metal oxides can comprise an oxide of zirconium, praseodymium or neodymium, or combinations of two or more of the oxides.

The amount of SCR catalyst in the filter can be reduced compared to a similar filter without copper doped ceria, iron doped ceria or manganese doped ceria.

EXAMPLES

The following non-limiting examples are provided to further demonstrate particular aspect of certain embodiments of the invention.

Example 1

Samples 1-6 were prepared by applying a washcoat comprising CeZr and various amounts of Cu onto the surface of an inert substrate as shown below. Sample 7 was prepared by applying a washcoat comprising CeZr and 5 wt % Fe onto the surface of an inert substrate. Samples 2-8 did not contain a zeolite. The samples were dried, and then calcined at 500° C. for 1 hour.

| Sample | Zeolite | Soot Catalyst | Cu Loading On Soot Catalyst |
|--------|---------|---------------|------------------------------|
| 1 | None | CeZr | 0% |
| 2 | | CeZr—Cu | 0.5% |
| 3 | | CeZr—Cu | 1% |
| 4 | | CeZr—Cu | 2% |
| 5 | | CeZr—Cu | 5% |
| 6 | | CeZr—Cu | 10% |
| 7 | | CeZr—Fe | 5% |

Each of the samples had about 10% soot added onto the surface of the catalyst.

The samples were analysed by thermogravimetric analysis (TGA) on a TA Q600 TGA to determine the soot combustion properties starting at a temperature of about 20° C. using a temperature ramp of 20° C./min to 600° C. in flowing air at 80 ml/min at 20 ml/min to determine the amount of soot that was combusted. Samples 1-6 were also analysed by UV/Visible spectroscopy using a Perkin Elmer Lambda 650s with an integrated sphere accessory.

The table below show the effect of copper loading on the peak oxidation temperature of the soot catalyst. CeZr with a 10% Cu loading exhibited the lowest soot oxidation temperature.

| Sample | Zeolite | Soot Catalyst | Cu Loading on Soot Catalyst | Peak Oxidation Temp (° C.) |
|--------|---------|---------------|------------------------------|-----------------------------|
| 1 | None | CeZr | 0% | 502 |
| 2 | None | CeZr—Cu | 0.5% | 500 |
| 3 | None | CeZr—Cu | 1% | 496 |
| 4 | None | CeZr—Cu | 2% | 487 |
| 5 | None | CeZr—Cu | 5% | 478 |
| 6 | None | CeZr—Cu | 10% | 469 |
| 7 | None | CeZr—Fe | 5% | 510 |

FIG. 1 is a graph demonstrating that the level of copper loading is related to the decrease in the temperature of decomposition in fresh (non-aged) samples. Fresh samples containing from 0.5-10% Cu were more effective at lowering the oxidation temperature than fresh sample without Cu or with 5% Fe.

Figure 2:
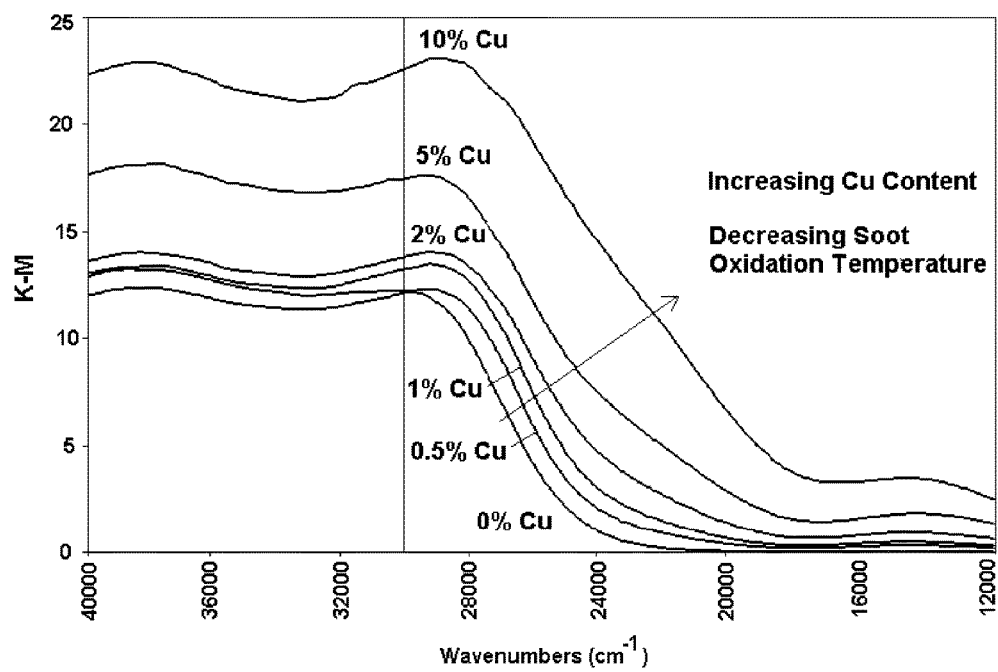
FIG. 2 is a graph showing the relationship between wavenumber versus Kubelka-Munk function for catalysts with different copper loadings in fresh samples.

FIG. 2 shows the effect of wavenumber versus Kubelka-Munk function for catalysts with different copper loadings in fresh samples. As the copper loading increases, the peak oxidation temperature decreases.

Example 2

Samples from Example 1 were aged at 800° C. for 16 hours. The samples were analysed by thermogravimetric analysis (TGA) and UV/visible spectroscopy as described in in Example 1.

The table below shows the effect of copper loading on the peak oxidation temperature of the soot catalyst in aged soot catalyst. CeZr with a 2% Cu loading exhibited the lowest peak soot oxidation temperature.

| Sample | | Peak Oxidation Temp (° C.) |
|--------|---|-----------------------------|
| 8 | Aged CeZr 0% Cu | 526 |
| 9 | Aged CeZr 0.5% Cu | 523 |
| 10 | Aged CeZr 1% Cu | 518 |
| 11 | Aged CeZr 2% Cu | 513 |
| 12 | Aged CeZr 5% Cu | 521 |
| 13 | Aged CeZr 10% Cu | 529 |
| 14 | Aged CeZr 5% Fe | 555 |

All aged samples containing Cu in any amount were more effective at reducing the oxidation temperature than aged samples comprising 5% Fe. Aged samples containing 0.5-5% Cu were more effective at reducing the oxidation temperature than aged samples comprising 0% Cu.

Figure 3:
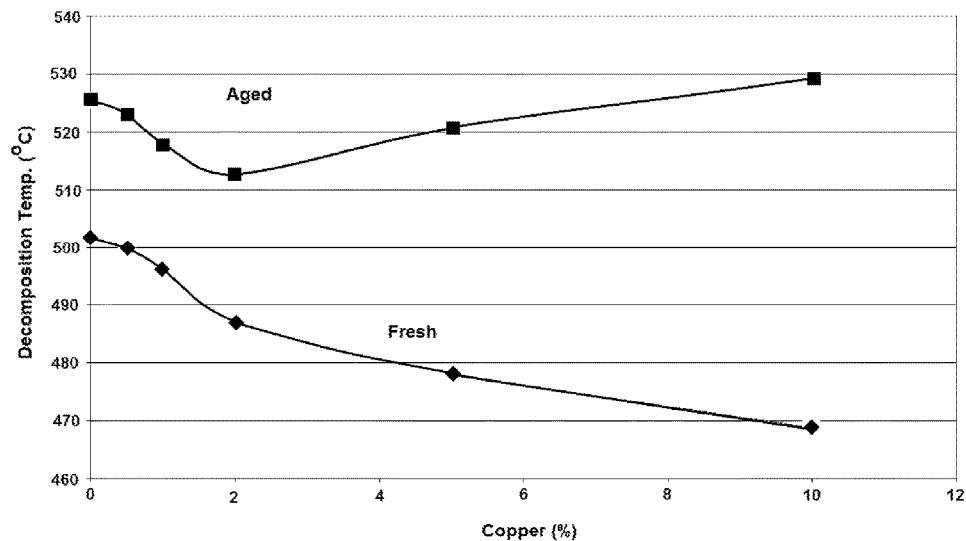
FIG. 3 is a graph showing the difference between fresh and aged catalyst on the decomposition temperature of soot with different copper loadings.

FIG. 3 demonstrates that there are differences in the catalytic activity between fresh and aged samples and 2% and 10% copper loadings provide the lowest decomposition temperatures for aged and fresh samples, respectively.

The increase in copper loading for the aged soot catalysts follows a different trend than for fresh samples. The aged soot catalyst with the lowest peak oxidation temperature has 2% copper loading, while soot catalysts with 5% and 10% Cu loading have a higher peak soot oxidation temperature. The high loaded copper samples after aging showed a larger decrease in the oxidation efficiency possibly due to the level of sintering.

Example 3

The ability of fresh and hydrothermally aged catalyst was evaluated on an engine bench test under passive (engine at 3000 rpm with catalyst at 490° C.) and active (exhaust flow of 100 kg/hr with catalyst at 630° C. for 12 minutes) conditions.

Figure 4:
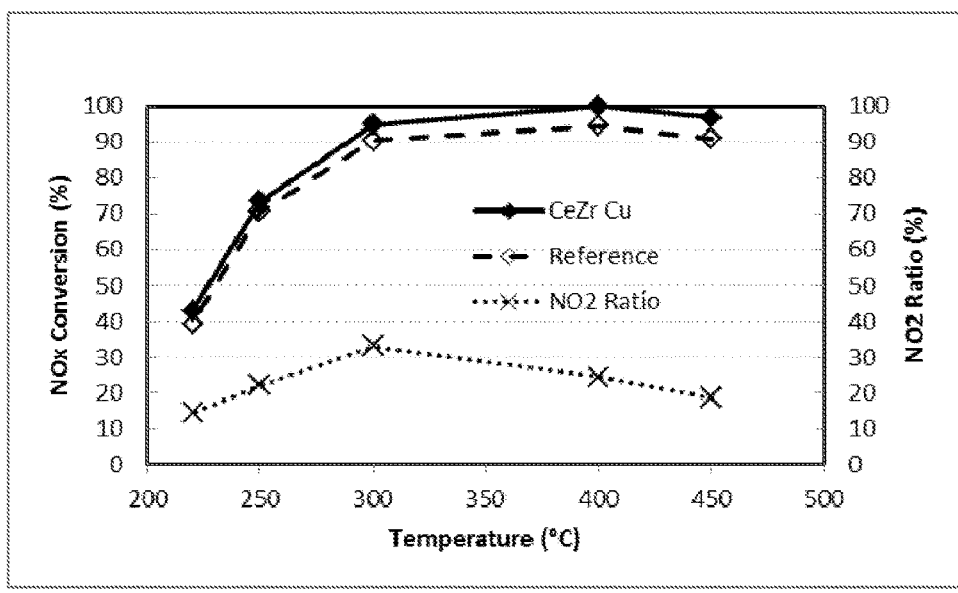
FIG. 4 is a graph showing the % NOx conversion of a catalyst comprising CeZr Cu and a catalyst without CeZr.

A reference catalyst comprised Cu-CHA at a loading of 0.81 g/in$^3$. A catalyst of the invention comprised Cu-CHA at a loading of 0.81 g/in$^3$ and CeZr+Cu (2 wt %) at a loading of 0.1 g/in$^3$. FIG. 4 shows the % NOx conversion at temperatures from about 225° C. to about 450° C. The catalyst comprising both Cu-CHA and CeZr—Cu (2 wt %) provided higher NOx conversion than the reference sample that did not contain CeZr—Cu. The NO$_2$: NOx ratio was between about 15% and about 35% over this temperature range. These results demonstrate that the presence of the required soot catalyst in a mixture with an SCR catalyst does not have a negative impact on the performance of the SCR catalyst.

The regeneration efficiency of the catalyst determined under passive and active conditions, as described above. The results are show in the table below.

| | Regeneration Efficiency (%) | | | |
|---|---|---|---|---|
| | Passive | | Active | |
| Catalyst | Fresh | Aged | Fresh | Aged |
| Reference (Cu-CHA – no CeZrCu) | 32 | 28 | 29 | 26 |
| Cu—CHA + CeZr—Cu (2 wt %) | 53 | 42 | 35 | 31 |

The above table shows that both fresh and aged catalyst comprising a CeZr—Cu soot catalyst can provide about a 15% to about a 25% increase in the amount of filter regeneration under passive conditions and about a 5% increase in the amount of filter regeneration under active conditions.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A composition comprising a mixture of an SCR catalyst and a soot catalyst comprising copper doped ceria, iron doped ceria or manganese doped ceria, wherein the composition is formulated for application to a filter.

2. The composition of claim 1, wherein the copper doped ceria, iron doped ceria or manganese doped ceria is doped with: (a) zirconia, (b) zirconia and praseodymium, (c) zirconia and neodymium, or (d) zirconia, praseodymium and neodymium.

3. The composition of claim 1, wherein the soot catalyst and the SCR catalyst are present in an amount having a weight ratio of soot catalyst:SCR catalyst of 5:95 to 95:5.

4. The composition of claim 1, wherein copper or manganese is present at from 0.5 to 15% by weight relative to the weight of ceria, or iron is present at from 0.5 to 10% by weight relative to the weight of ceria.

5. The composition of claim 1, wherein the composition further comprises one or more additional metal oxides.

6. The composition of claim 5, where the one or more additional metal oxides comprises an oxide of zirconium, praseodymium or neodymium, or combinations of two or more of the oxides.

7. The composition of claim 1, wherein the soot catalyst and the SCR catalyst are present in an amount having a weight ratio of soot catalyst:SCR catalyst of 5:95 to 50:50.

8. The composition of claim 1, wherein the soot catalyst and the SCR catalyst are present in an amount having a weight ratio of soot catalyst:SCR catalyst of 10:90 to 30:70.

9. A filter comprising an SCR catalyst and a soot catalyst comprising copper doped ceria, iron doped ceria or manganese doped ceria, where the SCR catalyst and the soot catalyst are present on the filter as a mixture.

10. The filter of claim 9, wherein the copper doped ceria, iron doped ceria or manganese doped ceria is doped with: (a) zirconia, (b) zirconia and praseodymium, (c) zirconia and neodymium, or (d) zirconia, praseodymium and neodymium.

11. The filter of claim 9, wherein the soot catalyst and the SCR catalyst are present in an amount having a weight ratio of soot catalyst:SCR catalyst of 5:95 to 95:5.

12. The filter of claim 9, wherein copper or manganese is present at from 0.5 to 15% by weight relative to the weight of ceria, or iron is present at from 0.5 to 10% by weight relative to the weight of ceria.

13. The filter of claim 9, wherein the filter further comprises one or more additional metal oxides.

14. The filter of claim 13, where the one or more additional metal oxides comprises an oxide of zirconium, praseodymium or neodymium, or combinations of two or more of the oxides.

15. The filter of claim 9, wherein the amount of SCR catalyst in the filter is reduced compared to a similar filter without copper doped ceria, iron doped ceria or manganese doped ceria.

16. The filter of claim 9, wherein the SCR catalyst is less susceptible to poisoning relative to comparable filters that do not comprise copper doped ceria, iron doped ceria or manganese doped ceria.

17. The filter of claim 9, wherein the soot catalyst and the SCR catalyst are present in an amount having a weight ratio of soot catalyst:SCR catalyst of 5:95 to 50:50.

18. The filter of claim 9, wherein the soot catalyst and the SCR catalyst are present in an amount having a weight ratio of soot catalyst:SCR catalyst of 10:90 to 30:70.

19. A system for treating a lean burn exhaust gas comprising: (a) a nitrogenous reducing agent injector; and (b) a catalytic filter comprising (i) an SCR catalyst and (ii) a soot catalyst comprising copper doped ceria, iron doped ceria or manganese doped ceria, where the SCR catalyst and the soot catalyst are present on the filter as a mixture and the injector is disposed upstream of, and is in fluid communication with, the catalytic filter.

20. A method for treating a lean burn exhaust gas comprising (a) flowing a lean burn exhaust gas stream comprising soot, NOx, and a nitrogenous reducing agent through a catalytic filter comprising (i) an SCR catalyst and (ii) a soot catalyst comprising copper doped ceria, iron doped ceria or manganese doped ceria, where the SCR catalyst and the soot catalyst are present on the filter as a mixture, (b) oxidizing at least a portion of the soot on the catalytic filter; and (c) reducing at least a portion of the NOx.

21. The method of claim 20, wherein the copper doped ceria, iron doped ceria or manganese doped ceria is doped with: (a) zirconia, (b) zirconia and praseodymium, (c) zirconia and neodymium, or (d) zirconia, praseodymium and neodymium.

22. The method of claim 20, wherein the soot catalyst and the SCR catalyst are present in an amount having a weight ratio of soot catalyst:SCR catalyst of 5:95 to 95:5.

23. The method of claim 20, wherein copper or manganese is present at from 0.5 to 15% by weight relative to the weight of ceria, or iron is present at from 0.5 to 10% by weight relative to the weight of ceria.

24. The method of claim 20, wherein the composition further comprises one or more additional metal oxides.

25. The method of claim 24, where the one or more additional metal oxides comprises an oxide of zirconium, praseodymium or neodymium, or combinations of two or more of the oxides.

26. The method of claim 20, wherein the soot catalyst and the SCR catalyst are present in an amount having a weight ratio of soot catalyst:SCR catalyst of 5:95 to 50:50.

27. The method of claim 20, wherein the soot catalyst and the SCR catalyst are present in an amount having a weight ratio of soot catalyst:SCR catalyst of 10:90 to 30:70.

28. A method for trapping particulate matter from exhaust gas emitted from an engine, the method comprising: contacting the exhaust gas containing the particulate matter with a filter comprising a mixture of an SCR catalyst and a soot oxidation catalyst comprising copper doped ceria, iron doped ceria or a manganese doped ceria.

\* \* \* \* \*